United States Patent
Boodaei

(10) Patent No.: US 9,727,715 B2
(45) Date of Patent: Aug. 8, 2017

(54) AUTHENTICATION METHOD AND SYSTEM USING PASSWORD AS THE AUTHENTICATION KEY

(71) Applicant: Michael Boodaei, Givatayim (IL)

(72) Inventor: Michael Boodaei, Givatayim (IL)

( * ) Notice: Subject to any disclaimer, the term of this patent is extended or adjusted under 35 U.S.C. 154(b) by 42 days.

(21) Appl. No.: 14/845,309

(22) Filed: Sep. 4, 2015

(65) Prior Publication Data

US 2016/0070894 A1    Mar. 10, 2016

Related U.S. Application Data

(60) Provisional application No. 62/046,964, filed on Sep. 7, 2014.

(51) Int. Cl.

| | |
|---|---|
| H04L 9/00 | (2006.01) |
| G06F 21/00 | (2013.01) |
| G06F 21/31 | (2013.01) |
| G06F 21/45 | (2013.01) |
| H04L 9/32 | (2006.01) |
| H04W 12/06 | (2009.01) |
| H04L 29/06 | (2006.01) |

(Continued)

(52) U.S. Cl.
CPC .............. *G06F 21/31* (2013.01); *G06F 21/45* (2013.01); *H04L 9/0825* (2013.01); *H04L 9/3226* (2013.01); *H04L 63/045* (2013.01); *H04L 63/083* (2013.01); *H04W 12/06* (2013.01); *H04L 2209/80* (2013.01); *H04L 2463/061* (2013.01); *H04L 2463/062* (2013.01); *H04W 12/10* (2013.01); *H04W 88/02* (2013.01)

(58) Field of Classification Search
CPC ....... H04L 63/08; H04L 63/083; G06F 21/31; G06F 21/41; G06F 21/32

USPC ........ 713/155, 168, 169, 182, 183; 726/2, 3, 726/4, 5

See application file for complete search history.

(56) References Cited

U.S. PATENT DOCUMENTS

| | | | |
|---|---|---|---|
| 2006/0156026 A1* | 7/2006 | Utin ....................... | G06F 21/31 713/183 |
| 2015/0310431 A1* | 10/2015 | Lakshmanan ...... | G06Q 20/3829 705/71 |

* cited by examiner

*Primary Examiner* — Alexander Lagor
(74) *Attorney, Agent, or Firm* — Roach Brown McCarthy & Gruber P.C.; Kevin D. McCarthy

(57) ABSTRACT

A computer implemented user authentication method, according to which a mobile application is installed on the mobile terminal device of the user and when the user inputs his username and password, the mobile application creates a private and public encryption keys and encrypts the password with the public key. Data including the encrypted password, the username and the public key is sent to a dedicated server and stored therein as an encrypted file under the username, along with information required for contacting the user's mobile terminal device. The user to selects, and enrolls to, an advanced authentication mechanism, which creates an authentication key for validating the identity of the user and encrypting the private key. The encrypted private key is stored on the user's terminal device. Upon launching the mobile application, the user selects a preferred advanced authentication mechanism which returns an authentication key upon successful authentication of the user. The authentication key is used to decrypt the encrypted private key. Then the encrypted password for the user is retrieved and the private key is used to decrypt the user's password. The user's username and password are then forwarded to the mobile application, to complete the authentication.

2 Claims, 3 Drawing Sheets

(51) Int. Cl.
*H04L 9/08* (2006.01)
*H04W 88/02* (2009.01)
*H04W 12/10* (2009.01)

AUTHENTICATION METHOD AND SYSTEM USING PASSWORD AS THE AUTHENTICATION KEY

FIELD OF THE INVENTION

The present invention relates to the field of authentication. More particularly, the invention relates to an authentication method and system, which uses password as the authentication key.

BACKGROUND OF THE INVENTION

Most applications today authenticate users with a username and a password (for example, during logging into mobile banking). As a result, the entire infrastructure which supports these applications is built for username/password authentication. As new and more advanced authentication techniques such as fingerprint, face recognition, voice recognition, and drawing a pattern emerge, application service providers need to adjust their systems to support these techniques. This requires a lot of expensive changes in the backend (a backend application or program serves indirectly in support of the frontend services, usually by having the capability to communicate with the required resource) authentication and authorization servers of the app service provider (to identify the currently signed-in user on the server).

It is therefore an object of the present invention to provide application developers with advanced authentication techniques without making any changes to their existing authentication backend.

Other objects and advantages of the invention will become apparent as the description proceeds.

SUMMARY OF THE INVENTION

The present invention is directed to a computer implemented user authentication method, which comprises the following steps:
a) installing a mobile application on the mobile device of the user;
b) allowing the user to input his username and password to the mobile application;
c) creating a private and public encryption keys and encrypts the password with the public key;
d) sending data including the encrypted password, the username and the public key to a dedicated server;
e) storing the data as an encrypted file in the dedicated server under the username, along with information required for contacting the user's terminal device;
f) allowing the user to select an advanced authentication mechanism and enrolls to the advanced authentication mechanism, which creates an authentication key, for validating the identity of the user;
g) using the authentication key to encrypt the private key;
h) storing the encrypted private key on the user's terminal device;
i) upon launching the mobile application, presenting the different advanced authentication options available to the user and allowing the user to select a preferred advanced authentication mechanism that returns an authentication key upon successful authentication of the user;
j) using the authentication key to decrypt the encrypted private key;
k) retrieving the encrypted password for the user and using the private key to decrypt the user's password; and
l) forwarding the user's username and password to the Mobile application, to completes the authentication.

Web authentication may be performed by:
a) upon completing a registration process of the user to the web authentication, allowing the user to access, via a computer, a website which is required to authenticate;
b) allowing the user to use his mobile device to authenticate with a selected authentication mechanism; and
c) transmitting the user's username and password used to log the user into the website, from the mobile device to the user's computer.
when the user accesses the website, displaying to the user an option to log in with the mobile application, to be selected;
b) Upon selecting the option by the user, the website sends the username to the dedicated server, which verifies that the user has a registered mobile device;
c) the dedicated server creates a symmetric encryption key and returns the symmetric encryption key to the website;
d) the dedicated server sends a push notification to the device which is registered for that username;
e) the user to opens the authentication mobile application on the mobile device and when the mobile application is launched connecting to the dedicated server and receiving a pending authentication request;
f) the dedicated SDK retrieves the symmetric encryption key from the dedicated Server and presents several available advanced authentication options;
g) the user selects an authentication option to authenticate;
h) the advanced authentication mechanism returns an authentication key upon successful authentication;
i) capturing the authentication key and using the authentication key to decrypt the encrypted private key;
j) retrieving the encrypted password for the user and using the private key to decrypt the user's password;
k) encrypting the password with the symmetric key received from the dedicated server and pushing the encrypted password to the dedicated server; and
l) the dedicated server pushes the encrypted password to the website, which decrypts it using the symmetric key, for allowing the website to complete the authentication process with the username and password.

The information required for contacting the user's terminal device may be a network address or a telephone number.

The advanced authentication mechanism may be selected from the group of:
a fingerprint scanner;
a pattern drawing;
a PIN code;
face recognition.

The present invention is directed to a computer system, which comprises:
a) a user's mobile terminal device having a mobile application, for allowing said user to input his username and password to said mobile application;
b) processing means for creating a private and public encryption keys and encrypts said password with said public key;
c) a dedicated server for receiving sent data including the encrypted password, the username and the public key;
d) storage means for storing said data as an encrypted file in said dedicated server under said username, along with information required for contacting the user's mobile terminal device,
e) said processing means is further adapted to:
f) allow said user to select an advanced authentication mechanism and enrolls to said advanced authentication mechanism, which creates an authentication key, for validating the identity of the user;

g) encrypt said private key using said authentication key;

h) store the encrypted private key on the user's terminal device;

i) upon launching the mobile application, present the different advanced authentication options available to the user and allowing said user to select a preferred advanced authentication option, said advanced authentication mechanism returns an authentication key upon successful authentication of the user;

j) decrypt the encrypted private key using said authentication key;

k) retrieve the encrypted password for the user and using said private key to decrypt the user's password; and l) forward the user's username and password to said mobile application, to completes the authentication.

DETAILED DESCRIPTION OF PREFERRED EMBODIMENTS

The method proposed by the present invention allows application developers to use advanced authentication techniques without making any changes to their existing authentication backend. As a result, the mobile application continues to use username and password as the secret for the user. An authentication layer takes each advanced authentication technique (e.g., a fingerprint, physiological patterns, face) and converts it to the user's original username and password. This process is transparent to the user. The process is also transparent to the backend of the mobile application/service. This is done using cooperation between three components: (a) a mobile application that resides on the user's terminal device (e.g., a smartphone); (b) a dedicated Software Development Kit (SDK) for mobile applications; (c) a dedicated server that stores credentials in a vault (a feature that allows keeping sensitive data such as passwords or keys in encrypted files, rather than as plaintext).

Example 1

Authentication Using a Mobile Application

Figure 1:
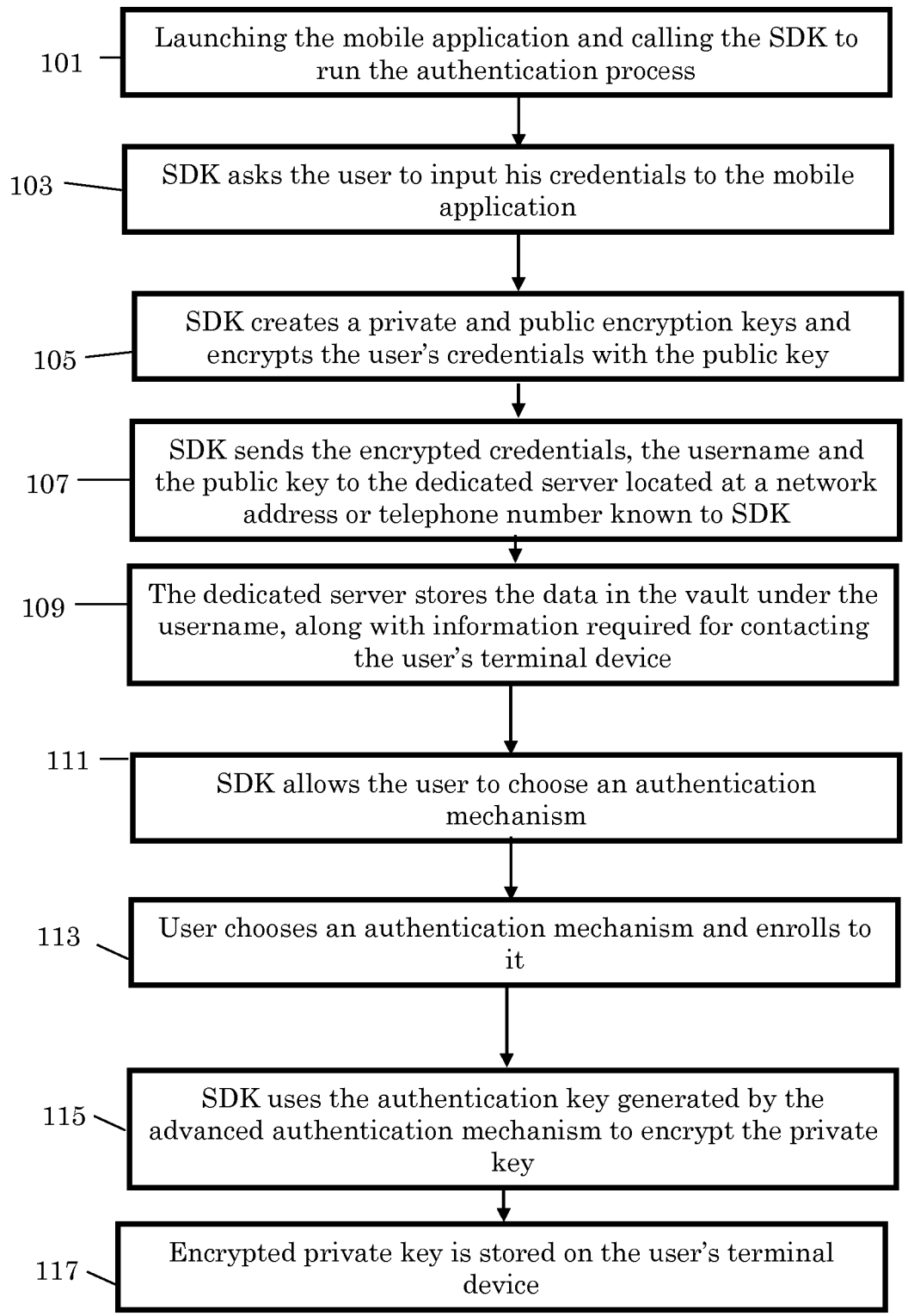
FIG. 1 schematically illustrates a flowchart of the registration process, according to an embodiment of the invention.

FIG. 1 schematically illustrates a flowchart of the registration process, according to an embodiment of the invention. At the first step 101, the mobile application is launched and calls the SDK to run the authentication process. At the next step 103, the SDK asks user to input his credentials (the username and password) to the mobile application. At the next step 105, the SDK creates a private and public encryption keys and encrypts the user's password with the public key. At the next step 107, the SDK sends the encrypted password, the username and the public key to the dedicated server located at a network address or telephone number known to SDK. At the next step 109, the dedicated server stores the data in the vault under the username, along with information required for contacting the user's terminal device (e.g., network address, telephone number), which is acquired using conventional techniques. At the next step 111, the SDK presents to the user a list of supported advanced authentication mechanisms, such as fingerprint scanner, pattern drawing, a PIN code, and face recognition. At the next step 113, the user chooses an advanced authentication mechanism and the SDK calls this advanced authentication mechanism for initiating an enrollment process. Each advanced authentication mechanism that the user enrolls to, generates a static authentication key. This key is only released by the advanced authentication mechanism if the user successfully authenticates to the advanced authentication mechanism.

At the next step 115, the SDK uses the authentication key generated by the advanced authentication mechanism to encrypt the private key. At the next step 117, the encrypted private key is stored on the user's terminal device.

Figure 2:
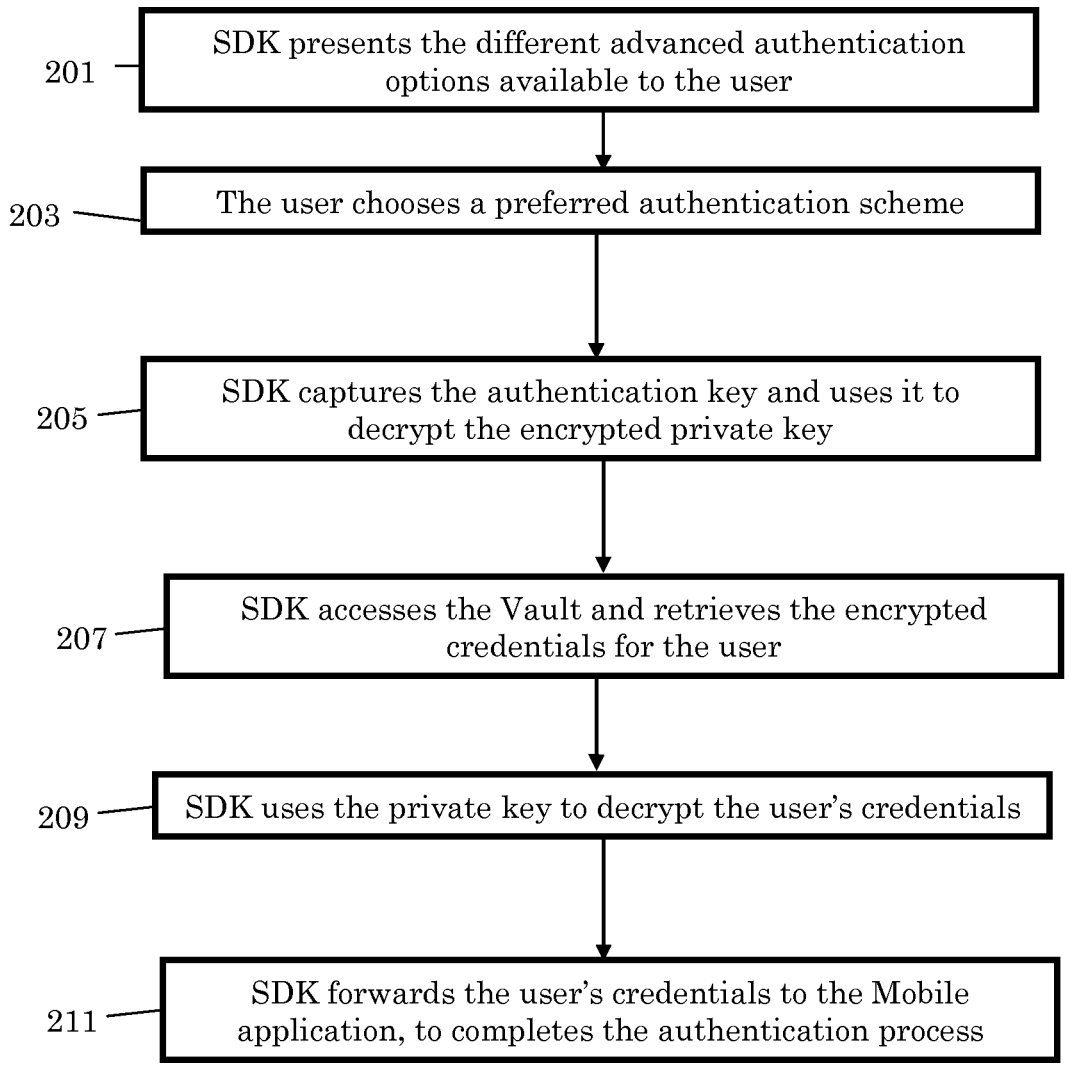
FIG. 2 schematically illustrates a flowchart of the authentication process, according to an embodiment of the invention.

FIG. 2 schematically illustrates a flowchart of the authentication process, according to an embodiment of the invention. At the first step 201, upon launching the mobile application the SDK is called to run the authentication process, during which the SDK presents the different advanced authentication options available to the user. At the next step 203, the user chooses a preferred advanced authentication option (such as pattern or finger authentication) and the SDK calls the advanced authentication mechanism for initiating an authentication process. If the user successfully authenticates to the advanced authentication mechanism, the advanced authentication mechanism returns back the authentication key to the SDK. At the next step 205, the SDK captures the authentication key and uses it to decrypt the encrypted private key. At the next step 207, the SDK accesses the Vault and retrieves the encrypted password for the user. At the next step 209, the SDK uses the private key to decrypt the user's password. At the next step 211, the SDK forwards the user's password and username to the Mobile application, which completes the authentication process using the username and password.

Example 1

Web Authentication

According to another embodiment, the above authentication process may be extended to web authentication, as well, where a user accesses a website via his computer, which he is required to authenticate. The user uses his mobile device to authenticate with a fingerprint or any other advanced authentication mechanism. The user's username and password are safely transmitted from the mobile device to the user's computer and are used to log the user into the website.

Figure 3:
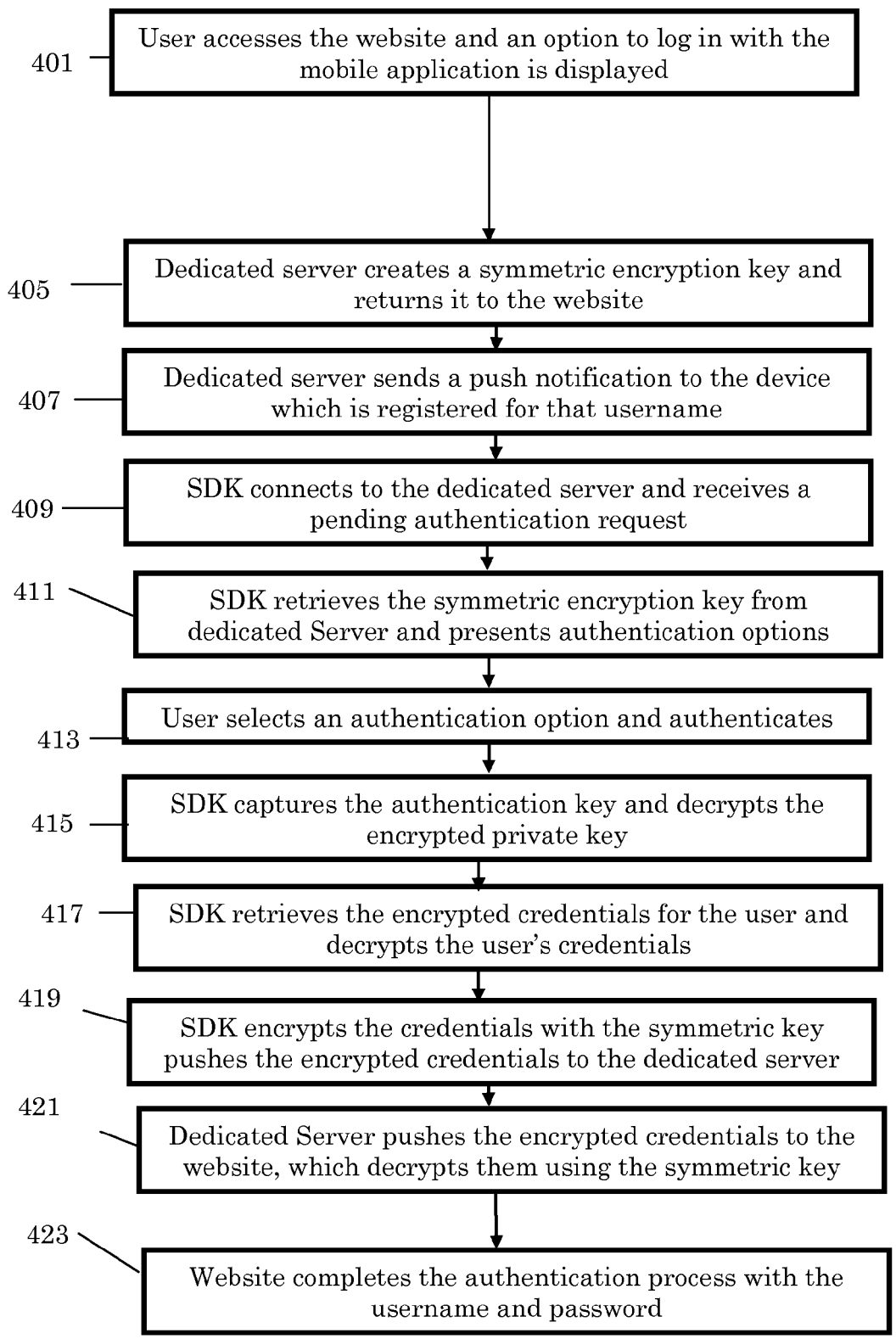
FIG. 3 schematically illustrates a flowchart of the web authentication process, according to an embodiment of the invention.

FIG. 3 schematically illustrates a flowchart of the web authentication process, according to an embodiment of the invention. At the first step 401, when the user accesses the website, an option to log in with the mobile application is displayed to him. When the user selects this option, the website sends the username to the dedicated server, which checks that the user has a registered mobile device (otherwise, the dedicated server returns to the website an error that the user has no registered devices). At the next step 405, the dedicated server creates a symmetric encryption key and returns it to the website. At the next step 407, the dedicated server optionally sends a push notification to the device which is registered for that username, so as to let the user know that an authentication request is pending. At the next step 409, the user opens the authentication mobile application on the mobile device and when the mobile application is launched, it calls the SDK, which connects to the dedicated server and receives a pending authentication request. At the next step 411, the SDK retrieves the symmetric encryption key from the dedicated Server and presents several available advanced authentication options. At the next step 413, the user selects an authentication option (such as pattern or finger authentication) and authenticates (this stage produces the authentication key). At the next step 415, the SDK captures the authentication key and uses it to decrypt the encrypted private key. At the next step 417, the SDK accesses the Vault on the dedicated server and retrieves the encrypted password for the user and uses the private key to decrypt the user's password. At the next step 419, the SDK encrypts the password with the symmetric key it received from the server and pushes the encrypted password to the dedicated server. At the next step 421, the dedicated Server pushes the encrypted password to the website, which decrypts it using the symmetric key. At the next step 423, the Website completes the authentication process with the username and password.

While some embodiments of the invention have been described by way of illustration, it will be apparent that the invention can be carried out with many modifications, variations and adaptations, and with the use of numerous equivalents or alternative solutions that are within the scope of persons skilled in the art, without exceeding the scope of the claims.

The invention claimed is:

1. A computer implemented user web authentication method, comprising:
   a) installing a mobile application on the mobile terminal device of said user;
   b) allowing said user to input his username and password to said mobile application;
   c) creating a private and public encryption keys and encrypts said password with said public key;
   d) sending data including the encrypted password, the username and the public key to a dedicated server;
   e) storing said data as an encrypted file in said dedicated server under said username, along with information required for contacting the user's terminal device;
   f) allowing said user to select an advanced authentication mechanism and enrolls to said advanced authentication mechanism, to create an authentication key, for validating the identity of the user;
   g) allowing the user to access a website and authenticate according to a selected authentication mechanism, using his mobile terminal device;
   h) when the user accesses the website, displaying to said user an option to log in with the mobile application, to be selected;
   i) upon selecting said option by said user, said website sends the username to said dedicated server, which verifies that the user has a registered mobile device;
   k) said dedicated server sends a push notification to the device which is registered for that username;
   l) said user to opens the authentication mobile application on the mobile device and when the mobile application is launched connecting to said dedicated server and receiving a pending authentication request;
   m) a dedicated SDK retrieves the symmetric encryption key from said dedicated server and presents several available advanced authentication options;
   n) the user selects an authentication option to authenticate;
   o) the advanced authentication mechanism returns an authentication key upon successful authentication;
   p) capturing the authentication key and using said authentication key to decrypt the encrypted private key;
   q) retrieving the encrypted password for said user and using the private key to decrypt the user's password;
   r) encrypting the password with the symmetric key received from the dedicated server and pushing the encrypted password to the dedicated server; and
   s) the dedicated server pushes the encrypted password to the website, which decrypts it using said symmetric key, for allowing the website to complete the authentication process with the username and password.

2. A user authentication method according to claim 1, wherein the advanced authentication mechanism is selected from the group of:
   a fingerprint scanner;
   a pattern drawing;
   a PIN code; and
   face recognition.

* * * * *